United States Patent [19]  [11] 4,039,513
Naarmann et al.  [45] Aug. 2, 1977

[54] POLYMERS CONTAINING FORMAMIDE GROUPS

[75] Inventors: Herbert Naarmann, Wattenheim; Heinz Pohlemann, Limburgerhof, both of Germany

[73] Assignee: BASF Aktiengesellschaft, Ludwigshafen, Germany

[21] Appl. No.: 656,310

[22] Filed: Feb. 9, 1976

[30] Foreign Application Priority Data

Feb. 20, 1975   Germany .............................. 2507189

[51] Int. Cl.$^2$ ......................... C08G 2/00; C08G 6/00; C08G 10/02; C08G 236/00
[52] U.S. Cl. ............................. 260/67 UA; 260/73 R
[58] Field of Search ........................ 260/67 UA, 73 R

[56] References Cited

U.S. PATENT DOCUMENTS 3,424,724   1/1969   Nordstrom .................... 260/67 UA

OTHER PUBLICATIONS

Erzin editor, "Advances in Chem. Series", 125 ACS, Wash. D.C., 1973, Nakajima, pp. 98–107.

Primary Examiner—Joseph L. Schofer
Assistant Examiner—Herbert J. Lilling
Attorney, Agent, or Firm—Keil, Thompson & Shurtleff

[57] ABSTRACT

Polymers which have formamide groups in the side branches and which may in addition contain other reactive groups. They can be used to produce moldings, coatings or adhesives.

6 Claims, No Drawings

POLYMERS CONTAINING FORMAMIDE GROUPS

The present invention relates to new polymers and to a process for their manufacture.

It is an object of the invention to provide polymers which exhibit the reactivity of formamide compounds and may in addition contain other reactive groups.

We have found that this object is achieved by providing polymers which contain structural units of the general formula

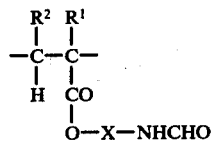

where $R^1$ hydrogen or methyl and $R^2$ is H, COOR, COOM, CONHR or COXNHCHO and X is —$(CH_2)_n$, n being an integer, preferably from 1 to

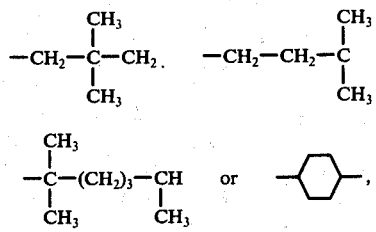

M is a metal or ammonium cation and R is H, alkyl, cycloalkyl or aryl.

These polymers are polyfunctional macromolecular compounds, which have formamide groups in the side branches and can undergo the corresponding substitution reactions. The new polymers have molecular weights of from 1,000 to 3,000,000, preferably from 10,000 to 100,000.

A further object of the invention is the manufacture of such polymers.

We have found that this object is achieved by polymerization of unsaturated formamide compounds of the general formula

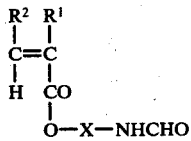

where $R^1$ is H or $CH_3$, $R^2$ is H, COOR, COOM, CONHR or COXNHCHO, X is —$(CH_2)_n$, n being an integer, preferably from 1 to 3,

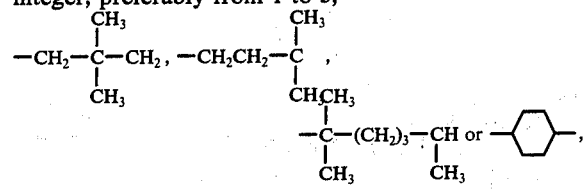

is H, alkyl, cycloalkyl or aryl, and M is a metal or ammonium cation, with or without other olefinically unsaturated monomers.

Particularly suitable unsaturated formamide derivatives are the compounds I to V

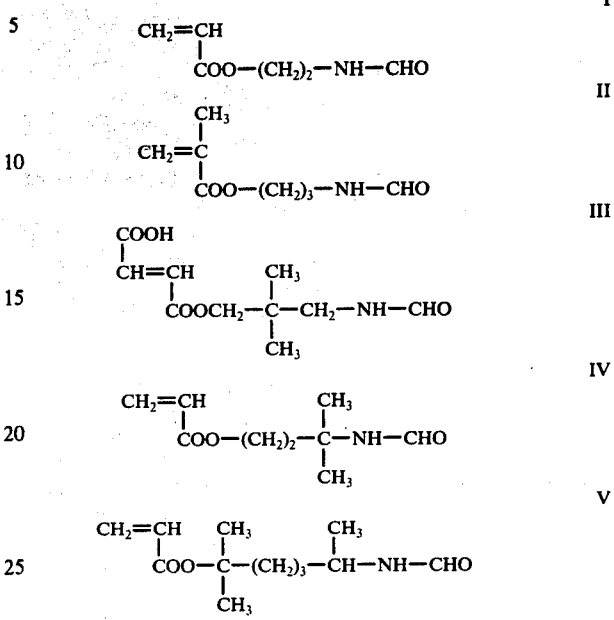

Such formamide derivatives may be obtained, eg., by preparing the corresponding formamides from the corresponding aminoalcohols and formic acid in a first stage, and then acylating these formamides at the OH group by reaction with unsaturated acid chlorides.

Examples of suitable olefinically unsaturated comonomers are olefins, eg. ethylene, propylene, butadiene or isoprene; styrene and substituted styrenes, eg. α-methylstyrene, p-chlorostyrene and p-methylstyrene; esters of acrylic acid and of methacrylic acid with, eg., methanol, ethanol, butanol or ethylcyclohexanol; hydroxy derivatives and amino derivatives of esters of acrylic acid, eg. hydroxypropyl acrylate and dimethylaminoethyl acrylate; acrylamide and methacrylamide and substituted amides, eg. N-methylolacrylamide, N-methylolmethacrylamide and their ethers; acrylonitrile and methacrylonitrile; vinyl esters, eg. vinyl acetate and vinyl propionate; vinyl ethers, eg. methyl vinyl ether and ethyl vinyl ether; fumaric acid, maleic acid and itaconic acid, and esters and anhydrides of these acids. It is also possible to copolymerize simultaneously two or more of these monomeric compounds with the formamide derivatives.

The properties of unsaturated formamide derivatives used in the manufacture of the copolymers can vary within broad limits, and can be, for example, from 1 to 99 percent by weight and especially from 5 go 20 percent by weight.

The polymerization is initiated either thermally or by means of conventional free radical initiators. Examples of suitable initiators are hydrogen peroxide, inorganic peroxides, organic hydroperoxides and peroxides, aliphatic azo compounds which decompose to give free radicals, redox catalyst systems, eg. the systems persulfate and ascorbic acid, sodium bisulfite or iron-II salts, and the chelates of transition metals known to form free radicals, especially chelates in which the metal is present in a suitable valency stage, eg. chelates of manganese-(III), cobalt-(III), copper-(II) and cerium-(IV), with 1,3-dicarbonyl compounds.

The initiators are generally used in amounts of from 0.05 to 5 percent by weight, based on the amount of monomer. The optimum amount and the most effective initiator can easily be found by tests.

The polymerization can be carried out in bulk but also in the presence of solvents or diluents. Very suitable examples of the latter are alcohols, ketones, ethers, aliphatic, cycloaliphatic and aromatic hydrocarbons, formamide and dimethylformamide. It is particularly advantageous to use water as the diluent.

The suspension, solution or emulsion polymerization processes conventionally used with other monomers are also suitable for the above process. The process according to the invention also does not differ from conventional processes in respect of the assistants which may or may not be used, eg. buffers, dispersing agents, protective colloids and the like.

The polymerization can be carried out in a wide range of temperatures, from about 0° to 100° C and preferably from 50 to 85° C. In general, it is carried out under atmospheric pressure, but reduced pressure or superatmospheric pressure, eg. up to 3,000 atmospheres gauge, may be used. Particularly when using low-boiling comonomers, the polymerization is carried out under superatmospheric pressure to ensure a sufficient concentration of the comonomer in the reaction mixture.

The copolymerization of the unsaturated formamide derivatives with ethylene or butadiene is advantageously carried out in emulsion by introducing the mutually copolymerizable monomers into an aqueous soap emulsion which contains an initiator, a buffer system and, if appropriate, a protective colloid, and polymerizing under superatmospheric pressure, The copolymerization with esters of acrylic acid is suitably carried out in aromatic or aliphatic hydrocarbons under the conventional conditions for the polymerization of such esters.

The polymers according to the invention may be used, eg., to produce moldings, coatings or adhesives, and may for these purposes also be mixed with other plastics, eg. polyethylene, polypropylene or copolymers of ethylene and vinyl acetate. Such products have an affinity for dyes. Because of their surface-active properties and antistatic properties, the polymers manufactured according to the invention may, inter alia, be used for paper coating and textile finishing. Copolymers of esters of acrylic acid which contain from about 2 to 20 percent by weight of a formamide derivative and from about 2 to 10 percent by weight of hydroxyl-containing monomers, eg. hydroxypropyl acrylate, are used as corrosion inhibitors and surface coatings. If the copolymer contains other reactive groups, eg. —OH, —NH$_2$ or —COOH, in addition to the formamide groups, it can be crosslinked by exposure to elevated temperatures and may be used as a reactive surface coating.

In the Examples, parts and percentages are by weight. The K values are a measure of the mean molecular weight and were in each case determined on a one percent strength solution and dimethylformamide, following the instructions of H. Fikentscher, Cellulosechemie 13 (1932), page 58.

EXAMPLE 1

100 parts of the compound I and 0.1 part of azo-bisisobutyronitrile are heated for 4 hours at 60° C under a nitrogen atmosphere, whilst stirring. After precipitation with methanol, washing and drying, 90 parts of a polymer having a K value of 49 and a glass transition temperature $T_G$ of $-30°$ C are obtained.

EXAMPLES 2 TO 12

Ethyl acrylate and compound II are mixed in certain ratios, 0.1% of azo-bis-isobutyronitrile is added to each mixture, and the mixture is heated at 70° C for 2 hours. The copolymers obtained are precipitated with methanol, washed and dried in a vacuum drying oven for 10 hours at 60° C and 12 mm Hg. The table which follows summarizes the properties of the products obtained:

| Example | Proportion of II in the batch (in %) | Conversion (in %) | K-value | Proportion of II in the copolymer (in %) |
|---|---|---|---|---|
| 2 | 1 | 97.0 | 56 | 0.8 |
| 3 | 5 | 95.0 | 55 | 4.3 |
| 4 | 10 | 95.0 | 52 | 9.7 |
| 5 | 20 | 94.5 | 58.5 | 17.8 |
| 6 | 30 | 96.0 | 54.5 | 27.0 |
| 7 | 40 | 98.0 | 57 | 38.6 |
| 8 | 50 | 98.0 | 59 | 48.2 |
| 9 | 60 | 97.5 | 58 | 68.7 |
| 10 | 70 | 99 | 56 | 68.8 |
| 11 | 80 | 100 | 34.5 | 78.0 |
| 12 | 90 | 100 | 62 | 89.0 |

EXAMPLE 13

30 parts of compound II are mixed with 2 parts of sodium pyrophosphate, 4.5 parts of potassium persulfate, 2 parts of the sodium salt of a sulfonated fatty alcohol of 10 to 15 carbon atoms and 1,000 parts of water. Butadiene is forced in above this mixture for 8 hours at 90° C, whilst stirring, in such amount as to give a butadiene pressure of 2.85 atmospheres gauge in the gas space. After the reaction time of 8 hours, the dispersion has a solids content of 20 percent by weight. The K value of the polymer obtained is 66. The content of copolymerized units of the formamide derivative III is 10.1%.

EXAMPLE 14

The procedure of Example 13 is followed but IV is used as the formamide derivative and butadiene is replaced by styrene. A dispersion having a solids content of 25% is obtained in 8 hours at 90° C. The K value of the copolymer, containing 19.2% of copolymerized units of compound IV, is 55.0.

EXAMPLE 15

The procedure of Example 9 is followed but the ethyl acrylate is replaced by acrylonitrile; a conversion of 78% and a K value of 51.5 are obtained, and the copolymer contains 48% of copolymerized units of the formamide derivative II.

We claim:

1. A polymer which contains structural units of the formula

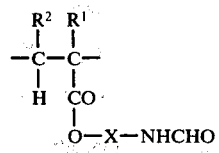

where R$^1$ is H or CH$_3$, R$^2$ is H, COOR, COOM, CONHR or COXNHCHO, X is —(CH$_2$)$_n$, $n$ being an integer,

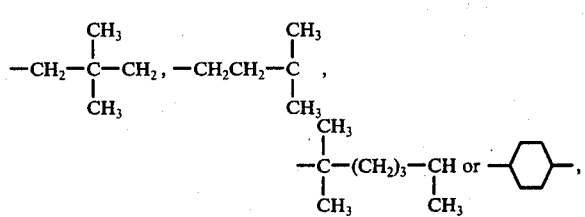

M is a metal cation or ammonium cation and R is H, alkyl, cycloalkyl or aryl.

2. A polymer as set forth in claim 1, where $R^1$ and $R^2$ are H and X is $CH_2CH_2$.

3. A polymer as set forth in claim 1, where $R^1$ is $CH_3$, $R^2$ is H and X is $CH_2CH_2CH_2$.

4. A polymer as set forth in claim 1, where $R^1$ is H, $R^2$ is COOH and X is $CH_2C(CH_3)_2CH_2$.

5. A polymer as set forth in claim 1, where $R^1$ and $R^2$ are H and X is $CH_2CH_2C(CH_3)_2$.

6. A polymer as set forth in claim 1, where $R^1$ and $R^2$ are H and X is $C(CH_3)_2CH_2CH_2CH_2CH(CH_3)$.

* * * * *